United States Patent
Morizawa et al.

(10) Patent No.: US 7,844,953 B2
(45) Date of Patent: Nov. 30, 2010

(54) PROGRAM, APPARATUS AND METHOD FOR VERIFYING PROGRAM

(75) Inventors: Rafael Kazumiti Morizawa, Kawasaki (JP); Shinya Kuwamura, Kawasaki (JP); Tsuneo Nakata, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1376 days.

(21) Appl. No.: 11/237,663

(22) Filed: Sep. 29, 2005

(65) Prior Publication Data

US 2007/0022325 A1    Jan. 25, 2007

(30) Foreign Application Priority Data

Jun. 30, 2005  (JP) .............................. 2005-191687

(51) Int. Cl.
G06F 9/44    (2006.01)
G06F 11/00   (2006.01)

(52) U.S. Cl. ................... 717/126; 717/104; 717/128; 714/37; 714/38; 714/49; 714/51

(58) Field of Classification Search ............ None
See application file for complete search history.

(56) References Cited

U.S. PATENT DOCUMENTS

| | | | |
|---|---|---|---|
| 6,067,415 A | | 5/2000 | Uchihira |
| 6,286,130 B1* | | 9/2001 | Poulsen et al. ............. 717/119 |
| 6,530,079 B1* | | 3/2003 | Choi et al. ................. 717/158 |
| 6,904,588 B2* | | 6/2005 | Reddy et al. ............... 717/104 |
| 7,007,251 B2* | | 2/2006 | Hekmatpour ................. 716/4 |
| 7,366,956 B2* | | 4/2008 | Karp et al. .................. 714/38 |
| 2004/0015900 A1* | | 1/2004 | Kawakatsu ................. 717/140 |
| 2004/0181781 A1* | | 9/2004 | Tohdo et al. ............... 717/124 |
| 2006/0130010 A1* | | 6/2006 | Rehof et al. ............... 717/136 |

(Continued)

FOREIGN PATENT DOCUMENTS

JP    4-343140    11/1992

(Continued)

OTHER PUBLICATIONS

Fogel et al., "Open Source Development with CVS, 3rd Edition" published by Paraglyph Press, Inc, 2003, ISBN 1-932111-81-6, pp. 1-368.*

(Continued)

*Primary Examiner*—Tuan Q Dam
*Assistant Examiner*—Zheng Wei
(74) *Attorney, Agent, or Firm*—Staas & Halsey LLP

(57) ABSTRACT

A program, an apparatus and a method verify a program that efficiently verifies a concurrent/parallel program, allowing interactively debugging the current/parallel program. The program causes a computer to execute a detection step that detects the function that has been altered and the function that uses a shared variable influenced by the alteration out of the program to be verified before and after the alteration and also detects the part that is influenced by the alteration, the control structure part and the other parts, a model generation step that generates a model on the basis of the outcome of the detection in the detection step and a verification step that verifies the program to be verified after the alteration by comparing the model of the program to be verified before the alteration and the model of the program to be verified after the alteration.

18 Claims, 21 Drawing Sheets

U.S. PATENT DOCUMENTS

2007/0006130 A1* 1/2007 Stamler et al. .............. 717/104

FOREIGN PATENT DOCUMENTS

| JP | 05-341974 | 12/1993 |
| JP | 8-328897 | 12/1996 |
| JP | 09-237191 | 9/1997 |

OTHER PUBLICATIONS

Lee et al., Principles and Methods of Testing Finite State Machine—A survey, Proceedings of the IEEE ISSN 0018-9219, vol. 84, 1996, pp. 1-64.*

Wayne Wolfe, "FPGA-Based System Design", Prentice Hall (Slides 25-28) 2004.

National University of Singapore, Hugh Anderson CS5270 Verification of Real Time Systems (slides 16-18) Feb. 2007.

Berard, B., Bidoit, M., Finkel, A., Laroussinie, F., Petit, A., Petrucci, L., Schnoebelen, P. "Systems and Software Verification Model—Checking Techniques and Tools", Springer-Verlag, 2001.

Japanese Office Action dated Jul. 28, 2009 for corresponding Japanese Patent Application No. 2005-191687.

* cited by examiner

```
int shared0 = 0;
int shared1 = 0;
```

```
mutex l, m;
Process1()
{
    while (1) {
        a();
        b();
        if (c()) {
            d();
        else
            e();
        l.lock();
        if (shared0 == 0)
            shared0 = 1;
        l.unlock();
        f();
        m.lock();
        g(shared1);
        shared1++;
        m.unlock();
        h();
    }
}
```

FIG. 4

```
mutex m;
Process2()
{
    while (1) {
        x();
        m.lock();
        y(shared1);
        shared1--;
        m.unlock();
        z();
    }
}
```

FIG. 5

```
mutex l, m;
Process1() // after alteration
{
    mutex l, m;
    while (1) {
        a();
        b();
        if (c())
            d();
        else
            e();
        l.lock();
        if (shared0 == 0)
            shared0 = 1;
        l.unlock();
        f();
        m.lock();
        g(shared1);
        m.unlock();
        h();
        m.lock();
        shared1++;
        m.unlock();
    }
}
```

FIG. 8

```
mutex l, m;
Process1() // after alteration
{
    mutex l, m;
    while (1) {
        a();
        b();
        if (c())
            d();
        else
            e();
        l.lock();
        if (shared0 == 0)
            shared0 = 1;
        l.unlock();
        f();
        m.lock(); // 1
        g(shared1); // 2
        m.unlock(); // 3
        h();
        m.lock(); // 4
        shared1++; // 5
        m.unlock(); // 6
    }
}
```

FIG. 9

```
mutex l, m;
Process1()
{
    while (1) {
        a();
        b();
        if (c()) {
            d();
        else
            e();
        l.lock();
        if (shared0 == 0)
            shared0 = 1;
        l.unlock();
        f();
        m.lock(); // S
        g(shared1); // S
        shared1++; // S
        m.unlock(); // S
        h();
    }
}
```

FIG. 10

```
mutex m;
Process2()
{
    while (1) {
        x();
        m.lock(); // S
        y(shared1); // S
        shared1--; // S
        m.unlock(); // S
        z();
    }
}
```

FIG. 12

```
mutex l, m;
Process1()
{
    while (1) {
        AA();
        if (c())
            BB();
        else
            CC();
        DD();
        m.lock(); // S
        g(shared1); // S
        shared1++; // S
        m.unlock(); // S
        EE();
    }
}
```

FIG. 13

```
mutex m;
Process2()
{
    while (1) {
        XX();
        m.lock(); // S
        y(shared1); // S
        shared1--; // S
        m.unlock(); // S
        ZZ();
    }
}
```

FIG. 14

```
mutex l, m;
Process1() // after alteration
{
    while (1) {
        A();
        if (c())
            B();
        else
            C();
        D()
        m.lock(); // 1
        g(shared1); // 2
        m.unlock(); // 3
        E();
        m.lock(); // 4
        shared1++; // 5
        m.unlock(); // 6
    }
}
```

FIG. 23

```
int shared = 0;
```

FIG. 24

```
mutex l, m;
Process3()
{
    while (1) {
        a();
        l.lock();
        m.lock();
        shared = 1;
        b(shared);
        m.unlock();
        l.unlock();
        c();
    }
}
```

FIG. 25

```
mutex l, m;
Process4()
{
    while (1) {
        d();
        l.lock();
        m.lock();
        shared = 2;
        e(shared);
        m.unlock();
        l.unlock();
        f();
    }
}
```

FIG. 26

```
mutex l, m;
Process4() // after alteration
{
    while (1) {
        d();
        m.lock(); // alteration
        l.lock(); // alteration
        shared = 2;
        e(shared);
        l.unlock(); // alteration
        m.unlock(); // alteration
        f();
    }
}
```

FIG. 27

```
mutex l, m;
Process4() // after alteration
{
    while (1) {
        D(); // D
        m.lock(); // E
        l.lock(); // E
        shared = 2; // E
        E(shared); // E
        l.unlock(); // E
        m.unlock(); // E
        F(); // F
    }
}
```

FIG. 32

```
int shared = 0;
```

FIG. 33

```
process01()
{
    while (1) {
        A();
        if (shared == 0) {
            shared = 1;
            a(shared);
        }
        B();
    }
}
```

FIG. 34

```
process02()
{
    while (1) {
        X();
        if (shared == 1) {
            shared = 0;
            b(shared);
        }
        Y();
    }
}
```

FIG. 35

```
mutex l;
process01()
{
    while (1) {
        A();
        l.lock();
        if (shared == 0) {
            shared = 1;
            a(shared);
        }
        l.unlock();
        B();
    }
}
```

FIG. 36

```
mutex l;
process02()
{
    while (1) {
        X();
        l.lock();
        if (shared == 1) {
            shared = 0;
            b(shared);
        }
        l.unlock();
        Y();
    }
}
```

PROGRAM, APPARATUS AND METHOD FOR VERIFYING PROGRAM

BACKGROUND OF THE INVENTION

1. Field of the Invention

This invention relates to a program, an apparatus and a method for verifying a program that verifies a concurrent program or a parallel program.

2. Description of the Related Art

A concurrent program or a parallel program is composed of a plurality of processes (threads). The processes may refer to and/or rewrite a shared same resource (common variable). However, when a plurality of processes is allowed to freely refer to and/or rewrite shared resources, a result that the program designer did not expect can be output by the program.

Now, a parallel program will be described by way of a specific example. The parallel program of this example is composed of a definition of shared variable "shared", a function "Process 01" and another function "Process 02". In the accompanying drawings, FIG. 32 illustrates a source code that is an example of definition of a shared variable in a parallel program while FIG. 33 illustrates a source code that is an example of function Process 01 and FIG. 34 illustrates a source code that is an example of function Process 02. The two processes Process 01 and Process 02 share a shared variable "shared". The parallel program is specified in such a way that the function Process 01 and the function Process 02 operate in parallel and functions a(1) and b(0) are invoked alternately. For example, a trace as described below can take place as that of a first parallel program.

1. Process 01. Refer to shared (shared==0)
2. Process 01. shared=1
3. Process 02. Refer to shared (shared==1)
4. Process 02. shared=0
5. Process 02. b (0)
6. Process 01. a (0)

The trace of this example is a has an error because the order of the execution of the function a and that of the function b is inverted and the both arguments become equal to 0 and do not meet the specified requirements.

A synchronizing mechanism such as MUTEX lock or semaphore is used to prevent such a problem. For example, programs can be modified by using a MUTEX lock. When a process refers or writes to a shared resource, using a synchronizing mechanism, the designed execution order is observed because another process does not interfere with it. FIG. 35 illustrates a source code that shows an example of result of modification of the function Process 01 in the parallel program. FIG. 36 illustrates a source code that shows an example of result of modification of the function Process 02 in the parallel program. In this example, the parts protected by lock l (from a call for locking and a call for unlocking) are sequentially executed.

For example, the technique that is described in Patent Document 1 (Japanese Patent Application Laid-Open Publication No. 8-328897) is known as a related conventional technique. The parallel program operation analysis method described in the above patent document is designed to display the state of transition of each of the parallel programs that operate on a parallel computer and support the effort of identifying the cause of the error, if any.

However, the number of the parts that are executed sequentially increases when a synchronizing mechanism as described above is put to use frequently. Then, the merit of the parallelism of programs will not be exploited satisfactorily. Such a situation is not desirable from the viewpoint of performance. Additionally, the operation of the synchronizing mechanism involves overhead, which by turn further reduces the performance.

However, many concurrent/parallel programs are executed on assumptions. Therefore, the load of synchronous operations can be partly alleviated when the programs are altered by taking the assumptions into consideration. Then, as the load of synchronous operations is alleviated, the time that can be spent for executing processes concurrently or in parallel is increased to improve the speed of execution of the entire programs. However, to improve the speed of execution of concurrent or parallel programs so as to make them operate properly, it is necessary to conduct the job of improving the speed of execution while comparing the outcome of the programs before the alterations and that of the programs after the alterations. Then, an interactive tool such as debugger is required for the job. Particularly, it is a difficult job to identify the error that is caused by synchronism of concurrent/parallel programs.

In the case of a debugger for ordinary serial programs, test data are selected in advance for the program to be debugged and the designer executes each step, observing the outcome of execution of the step. In the case of concurrent or parallel programs, the outcome of execution depends not only on the test data but also on the timing of accessing the shared resource of each process. However, debuggers for ordinary serial programs are not designed by taking such timings into consideration, therefore they are not suited for debugging concurrent/parallel programs.

Debuggers specifically designed for concurrent/parallel programs are available. Such debuggers adopt a technique of feeding test data, altering the timings of execution of processes that operate concurrently or in parallel. However, since all the timings of execution of processes have to be tested with such a technique, a very long time will have to be spent for debugging.

Additionally, formal verification techniques such as a model check technique are employed for debugging concurrent/parallel programs. An ordinary model check technique proceeds in a manner as described below. A model of an entire program that operates properly before an alteration such as a FSM (finite state machine) is prepared in advance. After the alteration of the program, a model of the altered program is prepared and the two models are compared by means of an equivalence verification technique or a similar technique. However, when in the case of a large scale program, the operation of preparing such a model is very time consuming and that of preparing models is also very time consuming. Therefore, the operation of interactively debugging an ordinary program has been a difficult one.

SUMMARY OF THE INVENTION

In view of the above-identified circumstances, it is therefore the object of the present invention to provide a program, an apparatus and a method for verifying a program that efficiently verifies a concurrent/parallel program, allowing interactively debugging the current/parallel program.

In an aspect of the present invention, the above object is achieved by providing a verification program of a program for causing a computer to verify a concurrent program or a parallel program composed so as to include a plurality of functions after an alteration made to the program to be verified, the verification program being adapted to cause a computer to execute: a detection step that detects the function that has been altered and the function that uses a shared variable influenced by the alteration along with the first part that includes the altered part of the altered function and the influenced part of the function using the shared variable influenced by the alteration, and the control structure part relating to the control of program processing and the second part other than the control structure part and the first part out of the program to be verified before and after the alteration made to the program to be verified; a model generation step that generates a model of the program to be verified before the alteration and a model of the program to be verified after the alteration on the basis of the control structure part, the first part and the second part detected in the detection step; and a verification step that verifies the program to be verified after the alteration by comparing the model of the program to be verified before the alteration and the model of the program to be verified after the alteration, the models being generated in the model generation step.

In a verification program for verifying a program according to the invention, the detection step defines the first part as the part where the shared variable influenced by the alteration appears and the locked part of the shared variable.

In a verification program for verifying a program according to the invention, the detection step adds a mark to the first part of the program to be verified.

In a verification program for verifying a program according to the invention, the model generation step generates a finite state machine as model by allocating the basic blocks of the first part and the second part to a state and expressing transition on the basis of the control structure part.

In a verification program for verifying a program according to the invention, the model generation step puts a plurality of states that do not contain the first part into a single state in the models.

In a verification program for verifying a program according to the invention, the verification step verifies the program to be verified after the alteration firstly by comparing the model before the alteration and the model after the alteration on the altered function and, if they are found to be not equivalent as a result of comparison, comparing the model before the alteration and the model after the alteration for the model obtained by multiplication of the state of a model of the altered function and that of a model of the function using the shared variable influenced by the alteration.

In a verification program for verifying a program according to the invention, the verification step detects a state that causes a predetermined error and displays the state when the model of the program to be verified before the alteration and the model of the program to be verified after the alteration are not equivalent.

In a verification program for verifying a program according to the invention, the verification step detects a state that causes a predetermined error and the sequence of execution that causes the state and displays the sequence of execution when the model of the program to be verified before the alteration and the model of the program to be verified after the alteration are not equivalent.

In a verification program for verifying a program according to the invention, the verification step verifies the program to be verified after the alteration, using a rule base check or a model check.

In another aspect of the present invention, there is provided a verification apparatus for verifying a program that verifies a concurrent program or a parallel program composed so as to include a plurality of functions after an alteration made to the program to be verified, the verification apparatus comprising: a detecting section that detects the function that has been altered and the function that uses a shared variable influenced by the alteration along with the first part that includes the altered part of the altered function and the influenced part of the function using the shared variable influenced by the alteration, and the control structure part relating to the control of program processing and the second part other than the control structure part and the first part out of the program to be verified before and after the alteration made to the program to be verified; a model generating section that generates a model of the program to be verified before the alteration and a model of the program to be verified after the alteration on the basis of the control structure part, the first part and the second part detected by the detecting section; and a verifying section that verifies the program to be verified after the alteration by comparing the model of the program to be verified before the alteration and the model of the program to be verified after the alteration, the models being generated by the model generating section.

In a verification apparatus for verifying a program according to the invention, the detecting section defines the first part as the part where the shared variable influenced by the alteration appears and the locked part of the shared variable.

In a verification apparatus for verifying a program according to the invention, the detecting section adds a mark to the first part of the program to be verified and the model generating section sorts the first part from the second part by detecting the mark.

In a verification apparatus for verifying a program according to the invention, the model generating section generates a finite state machine as model by allocating the basic blocks of the first part and the second part to a state and expressing transition on the basis of the control structure part.

In a verification apparatus for verifying a program according to the invention, the model generating section puts a plurality of states that do not contain the first part into a single state in the models.

In a verification apparatus for verifying a program according to the invention, the verifying section verifies the program to be verified after the alteration firstly by comparing the model before the alteration and the model after the alteration on the altered function and, if they are found to be not equivalent as a result of comparison, comparing the model before the alteration and the model after the alteration for the model obtained by multiplication of the state of a model of the altered function and that of a model of the function using the shared variable influenced by the alteration.

In a verification apparatus for verifying a program according to the invention, the verifying section detects a state that causes a predetermined error and displays the state when the model of the program to be verified before the alteration and the model of the program to be verified after the alteration are not equivalent.

In a verification apparatus for verifying a program according to the invention, the verifying section detects a state that causes a predetermined error and the sequence of execution that causes the state and displays the sequence of execution when the model of the program to be verified before the alteration and the model of the program to be verified after the alteration are not equivalent.

In a verification apparatus for verifying a program according to the invention, the verification section verifies the program to be verified after the alteration, using a rule base check or a model check.

In still another aspect of the invention, there is provided a verification method for verifying a program that verifies a concurrent program or a parallel program to be verified after an alteration made to the program to be verified, the verification method comprising: a detection step that detects the function that has been altered and the function that uses a shared variable influenced by the alteration out of the program to be verified before and after the alteration made to the program to be verified and also detects the first part that is the part influenced by the alteration out of the detected functions; a model generation step that sorts the control structure, the first part and the second part other than the control structure and the first part out of the functions detected in the detection step and generates a model of the program to be verified before the alteration and a model of the program to be verified after the alteration on the basis of the sorting; and a verification step that verifies the program to be verified after the alteration by comparing the model of the program to be verified before the alteration and the model of the program to be verified after the alteration, the models being generated in the model generation step.

Thus, according to the invention, it is possible to conduct an interactive debugging operation by significantly reducing the time required for verifying a concurrent/parallel program and hence it is possible to remarkably improve the efficiency of developing concurrent/parallel programs.

BRIEF DESCRIPTION OF THE DRAWINGS

FIG. 4 is a schematic illustration of a source code showing function Process 2 in the first program to be verified;

FIG. 5 is a schematic illustration of a source code showing function Process 1 after an alteration in the first program to be verified;

FIG. 8 is a schematic illustration of a source code showing as an example the results of an alteration detection process of function Process 1 after an alteration in the first program to be verified;

FIG. 9 is a schematic illustration of a source code showing as an example the results of an alteration detection process of function Process 1 before an alteration in the first program to be verified;

FIG. 10 is s a schematic illustration of a source code showing as an example the results of an alteration detection process of function Process 2 in the first program to be verified;

FIG. 12 is a schematic illustration of a source code showing as an example the results of a source code sorting process of function Process 1 before an alteration in the first program to be verified;

FIG. 13 is a schematic illustration of a source code showing as an example the results of a source code sorting process of function Process 2 in the first program to be verified;

FIG. 14 is a schematic illustration of a source code showing as an example the results of a source code sorting process of function Process 1 after an alteration in the first program to be verified;

FIG. 23 is a schematic illustration of a source code showing the definition of a shared variable in the second program to be verified;

FIG. 24 is a schematic illustration of a source code showing function Process 3 in the second program to be verified;

FIG. 25 is a schematic illustration of a source code showing function Process 4 before an alteration in the second program to be verified;

FIG. 26 is a schematic illustration of a source code showing function Process 4 after an alteration in the second program to be verified;

FIG. 27 is a schematic illustration of a source code showing as an example the results of a source code sorting process of function Process 4 after an alteration in the second program to be verified;

FIG. 32 is a schematic illustration of a source code showing the definition of a shared variable in a parallel program;

FIG. 33 is a schematic illustration of a source code showing as an example function Process 01 in a parallel program;

FIG. 34 is a schematic illustration of a source code showing as an example function Process 02 in a parallel program;

FIG. 35 is a schematic illustration of a source code showing as an example the results of modification of function Process 01 in a parallel program; and FIG. 36 is a schematic illustration of a source code showing as an example the results of modification of function Process 02 in a parallel program.

DETAILED DESCRIPTION OF THE PREFERRED EMBODIMENTS

Now, the present invention will be described in greater detail by referring to the accompanying drawings that illustrate preferred embodiments of the invention.

First Embodiment

In the description of this embodiment, it is assumed that a MUTEX lock is used as synchronizing mechanism and there is a data race between the shared variables as a result of an alteration made to a program.

Figures 1, 2, 3:
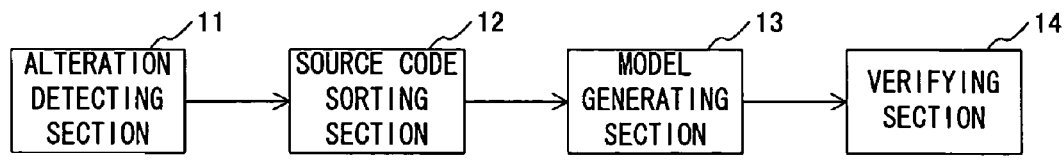
FIG. 1 is a schematic block diagram of a program verification apparatus according to the invention, showing the configuration thereof as an example.
FIG. 2 is a schematic illustration of a source code showing the definition of a shared variable in the first program to be verified.
FIG. 3 is a schematic illustration of a source code showing function Process 1 before an alteration in the first program to be verified.

FIG. 1 is a schematic block diagram of a program verification apparatus according to the invention, showing the configuration thereof as an example. This program verification apparatus comprises an alteration detecting section 11, a source code sorting section 12, a model generating section 13 and a verifying section 14.

Firstly, the operation of a program verification apparatus according to the invention will be described in terms of the first program to be verified as a specific example of parallel program. The source code of the first program to be verified comprises a definition of a shared variable, a function Process 1 and another function Process 2. FIG. 2 is a schematic illustration of the source code showing the definition of the shared variable in the first program to be verified. FIG. 3 is a schematic illustration of the source code showing the function Process 1 before an alteration in the first program to be verified. FIG. 4 is a schematic illustration of the source code showing the function Process 2 in the first program to be verified. FIG. 5 is a schematic illustration of the source code showing the function Process 1 after an alteration in the first program to be verified. As seen from the figures, there is a data race involving the shared variable shared 1 between the function Process 1 and the function Process 2 when the function Process 1 is altered.

Figure 6:
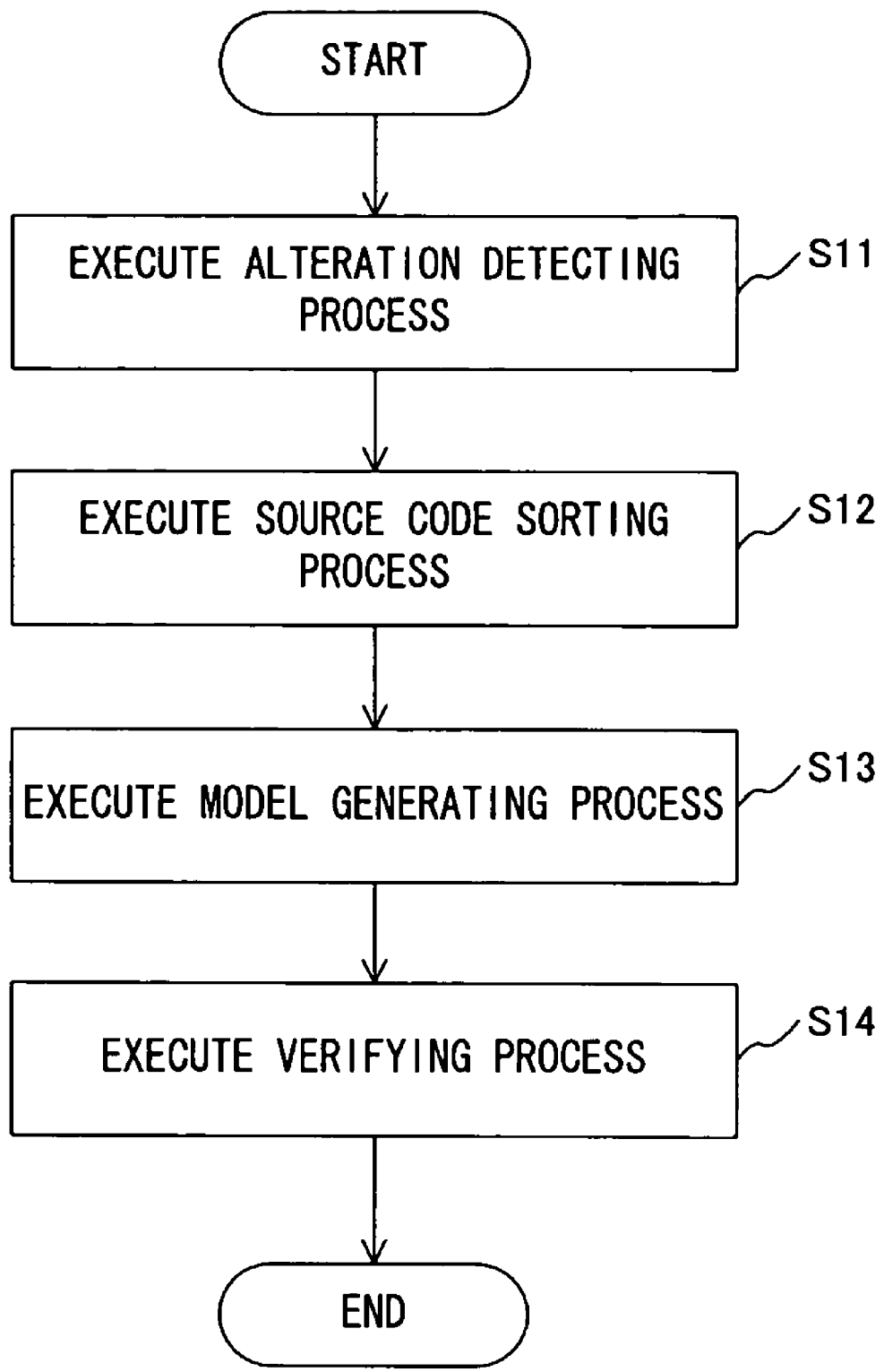
FIG. 6 is a flow chart of an example of operation of the program verification apparatus according to the invention.

FIG. 6 is a flow chart of an example of operation of the program verification apparatus according to the invention.

Firstly, the alteration detecting section 11 executes an alteration detection process of reading the program before the alteration and the program after the alteration and checking the difference between them (S11).

Figure 7:
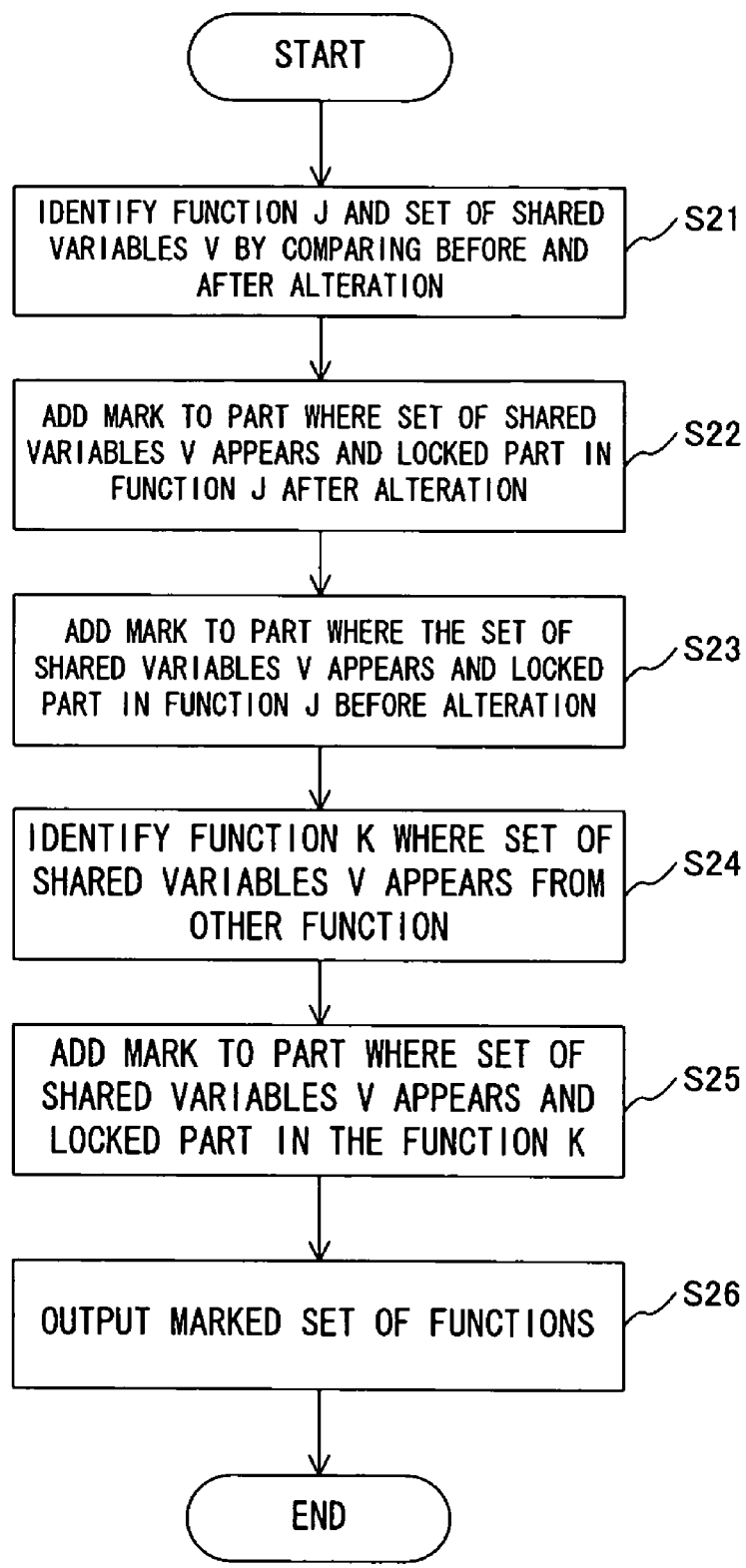
FIG. 7 is a flow chart of an example of operation of an alteration detection process according to the invention.

FIG. 7 is a flow chart of an example of operation of an alteration detection process according to the invention. Firstly, the alteration detecting section 11 compares the program before the alteration and the program after the alteration and identifies function J that was altered and the set of shared variables V that was influenced by the alteration (S21). Then, the alteration detecting section 11 adds a mark to the part where set of shared variables V appears and the locked part in function J after the alteration (S22). Thereafter, the alteration detecting section 11 adds a mark to the part where the set of shared variables V appears and the locked part in function J before the alteration (S23). Subsequently, the alteration detecting section 11 identifies function K where the set of shared variables V appears from the other function (S24). Then, the alteration detecting section 11 adds a mark to the part where the set of shared variables V appears and the locked part in the function K (S25). Thereafter, the alteration detecting section 11 output the marked set of functions (S26) and ends the process.

Now, a specific example of alteration detection process will be described below. FIG. 8 is a schematic illustration of a source code showing as an example the results of an alteration detection process of function Process 1 after an alteration in the first program to be verified. Referring to FIG. 8, firstly the alteration detecting section 11 identifies the function Process 1 as the only function that is altered and also the part where of the function Process 1 that is altered and subsequently adds marks "//1" through "//6" to the identified part. The alteration detecting section 11 identifies shared variable shared 1 as the shared variable that is used at the altered part.

FIG. 9 is a schematic illustration of a source code showing as an example the results of an alteration detection process of function Process 1 before an alteration in the first program to be verified. Then, the alteration detecting section 11 identifies the part of the Process 1 where shared 1 appears before the alteration and adds mark "//S" to the identified part. FIG. 10 is a schematic illustration of a source code showing as an example the results of an alteration detection process of function Process 2 in the first program to be verified. Then, the alteration detecting section 11 retrieves another process that uses variable shared 1, identifies function Process 2 and also the part where shared 1 appears in the function Process 1 and adds mark "//S" to the identified part. As a result, the output of the alteration detecting section 11 is a set of the function Process 1 before the alteration, the function Process 1 after the alteration and the function Process 2 and the source code where marks are added to the altered parts and the parts influenced by the alterations.

Subsequently, the source code sorting section 12 sorts the control structure, the part that is influenced by an alteration and the remaining part (S12). The source code sorting section 12 sorts out sentences on a basic block by basic block basis, leaving the control structure and the marked sentences unsorted. A basic block is a block defined for compiler techniques and refers to a block having only an entrance and an exit for a control flow.

Figure 11:
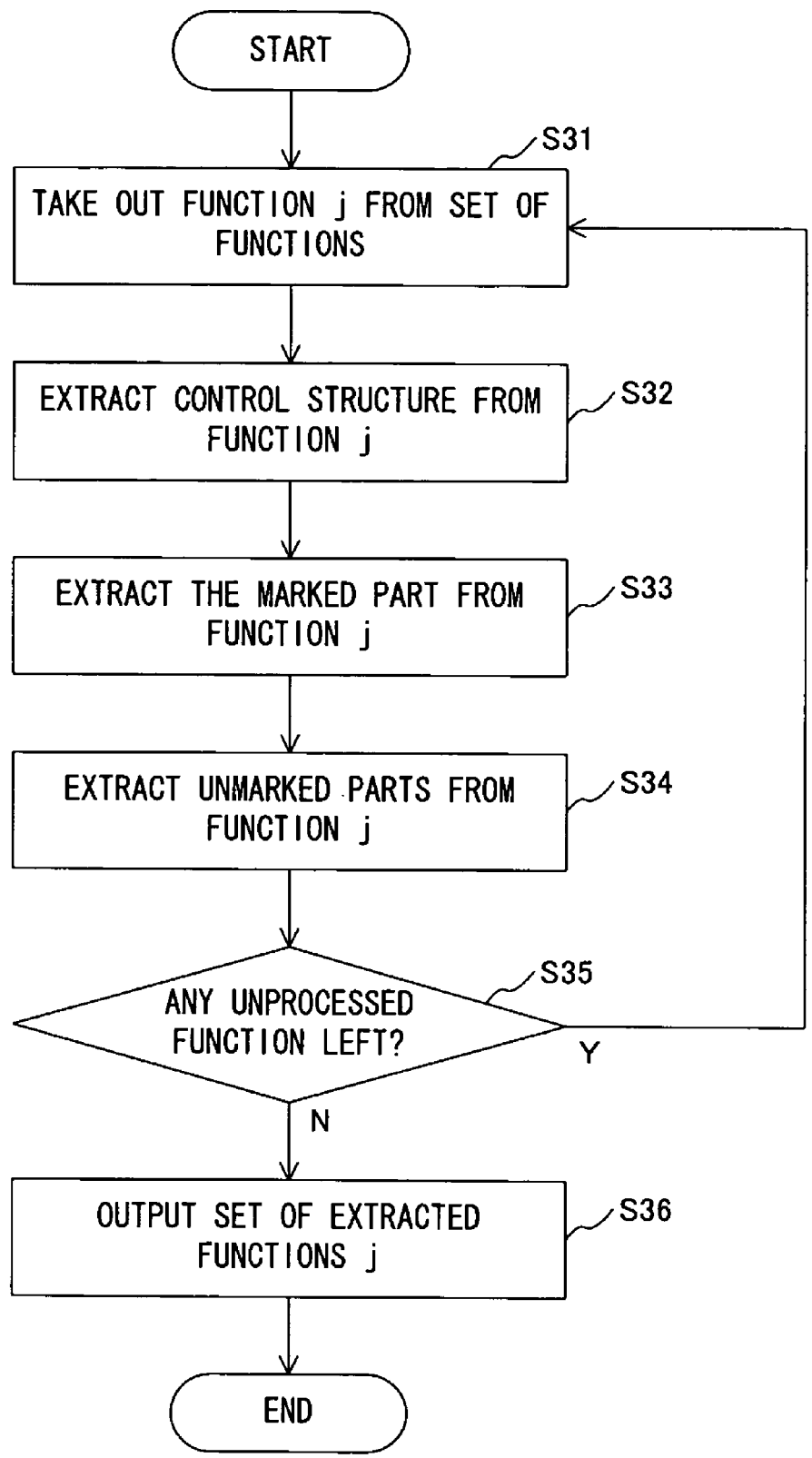
FIG. 11 is a flow chart of an example of operation of a source code sorting process according to the invention.

FIG. 11 is a flow chart of an example of operation of a source code sorting process according to the invention. Referring to FIG. 11, firstly the source code sorting section 12 takes out a function j from a set of functions that is an output of the alteration detecting section 11 (S31). Then, the source code sorting section 12 extracts the control structure from the function j and outputs it to a new extracted function j' (S32). Thereafter, the source code sorting section 12 extracts the marked part from the function j and outputs it to the extracted function j' (S33). Subsequently, the source code sorting section 12 sorts out the unmarked parts from the function j, extracts them on a basic block by basic block basis and outputs them to the extracted function j' (S34). Then, the source code sorting section 12 determines if any unprocessed function is left in the set of functions or not (S35). If an unprocessed function is left (S35, Y), it returns to the processing step S31. If, on the other hand, there is not any unprocessed function left (S35, N), it outputs the set of extracted functions j' as set of extracted functions (S36) and ends the flow.

Now, the source code sorting process will be described by way of a specific example. FIG. 12 is a schematic illustration of a source code showing as an example the results of a source code sorting process of function Process 1 before an alteration in the first program to be verified. The basic blocks of function Process 1 before an alteration are sorted as pseudo-function AA ( ), pseudo-function BB ( ), pseudo-function CC ( ), pseudo-function DD ( ) and pseudo-function EE ( ). FIG. 13 is a schematic illustration of a source code showing as an example the results of a source code sorting process of function Process 2 in the first program to be verified. The basic blocks of function Process 2 are sorted as pseudo-function XX ( ) and pseudo-function ZZ ( ).

FIG. 14 is a schematic illustration of a source code showing as an example the results of a source code sorting process of function Process 1 after an alteration in the first program to be verified. The basic blocks of the function Process 1 after the alteration can be sorted by sorting function a ( ) and function b ( ) as pseudo-function A ( ), function d ( ) as pseudo-function B ( ), function e ( ) as pseudo-function C ( ), function I.lock ( ) through function f ( ) as pseudo-function D ( )and function h ( ) as pseudo-function E ( ).

Then, the model generating section 13 transforms the result of the source code sorting process into a model (S13). The type of the model may vary depending on the technique used in the verification process as will be described hereinafter, a model check is used for the verification process of this embodiment and an FSM is used as model. The model generating section 13 allocates the states of the results of the source code sorting process on a basic block by basic block basis or on a block by block basis for referring to a shared variable and additionally realizes state optimization. State optimization is a process of sorting states that do not contain any marked part as a single state. It can be realized by applying the State Minimization algorithm.

Figure 15:
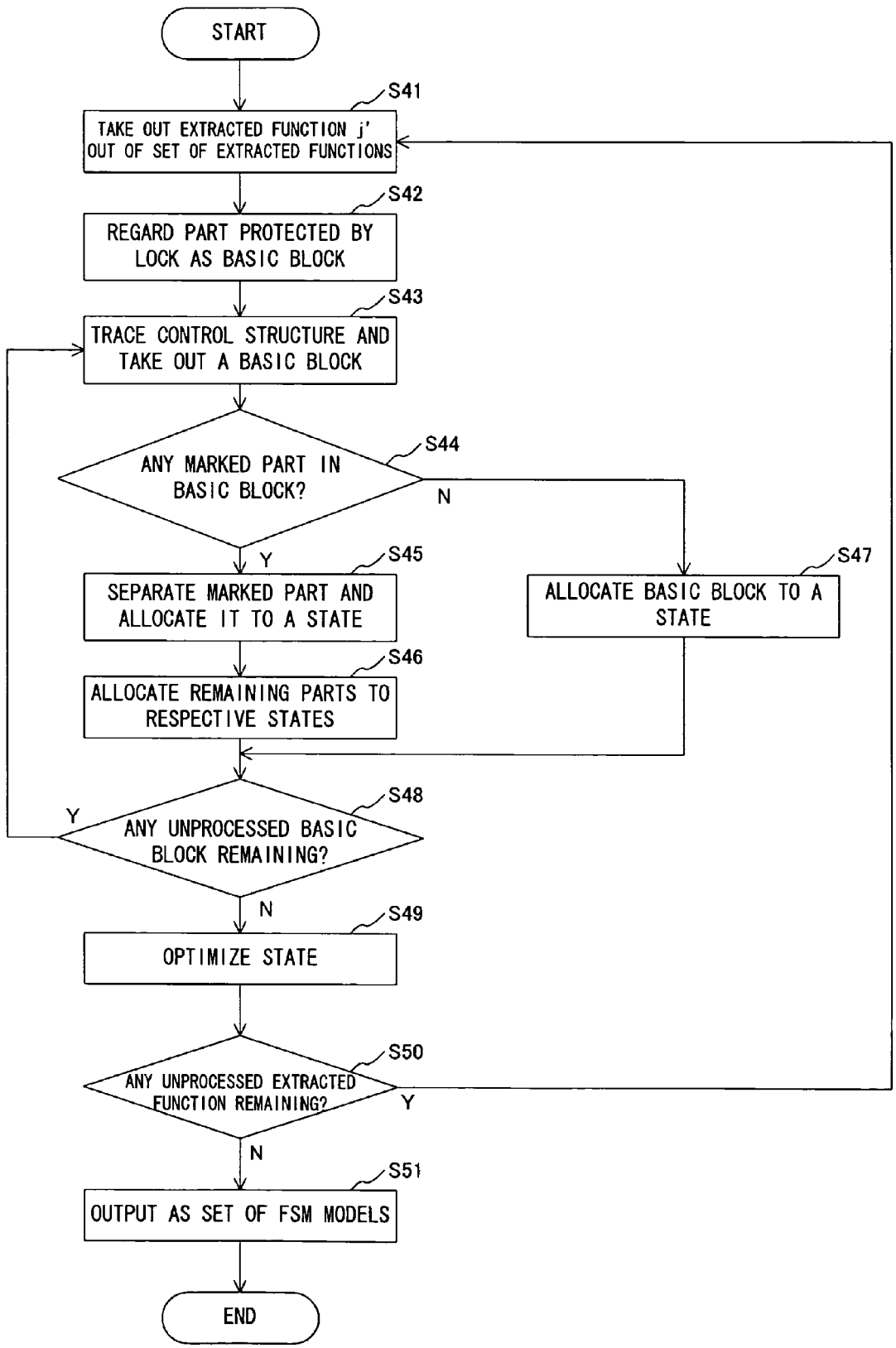
FIG. 15 is a flow chart of an example of operation of a model generation process according to the invention.

FIG. 15 is a flow chart of an example of operation of a model generation process according to the invention. Referring to FIG. 15, firstly the model generating section 13 takes out an extracted function j' out of a set of extracted functions that is the output of the source code sorting section 12 (S41). Then, the model generating section 13 regards the part protected by a lock as basic block (S42). Thereafter, the model generating section 13 traces the control structure of the extracted function j' and takes out a basic block (S43). Subsequently, the model generating section 13 determines if there is any marked part in the basic block or not (S44). If there is at least a marked part (S44, Y), the model generating section 13 separates the marked part from the basic block and allocates it to a state (S45), while it allocates the remaining parts to respective states (S46) and proceeds to the processing step S48. If, on the other hand, there is not any marked part (S44, N), the model generating section 13 allocates the basic block to a state (S47) and proceeds to the processing step S48.

Then, in the processing step S48, the model generating section 13 determines if any unprocessed basic block is remaining or not (S48). If at least an unprocessed basic block is remaining (S48, Y), it returns to the processing step S43. If, on the other hand, no unprocessed basic block is remaining (S48, N), the model generating section 13 realizes state optimization (S49). Thereafter, the model generating section 13 determines if any unprocessed extracted function is remaining in the set of extracted functions (S50). If at least an unprocessed extracted function is remaining (S50, Y), it returns to the processing step S41. If, on the other hand, no unprocessed extracted function is remaining (S50, N), the model generating section 13 outputs the results of state optimization as a set of FSM models (S51) and ends the flow.

Figure 16:
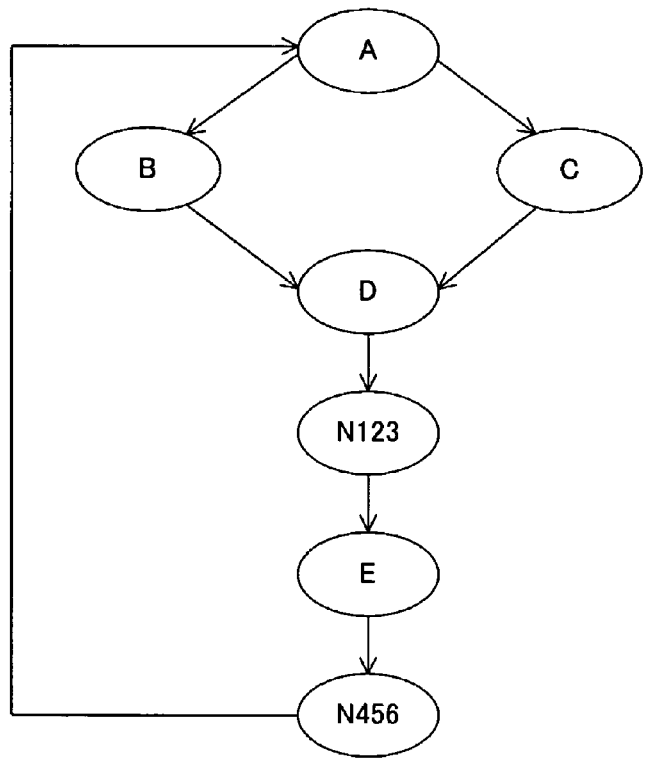
FIG. 16 is a schematic illustration of a model, showing as an example the results of state allocation in a model generation process of function Process 1 after an alteration in the first program to be verified.
Figure 17:
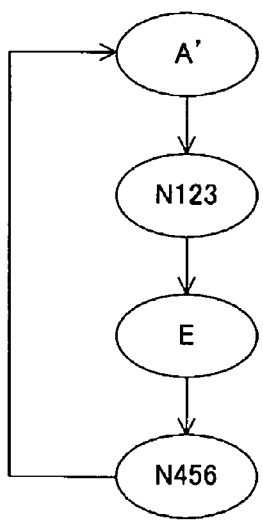
FIG. 17 is a schematic illustration of a model, showing as an example the results of a model generation process of function Process 1 after an alteration in the first program to be verified.

Now, a specific example of model generation process will be described below. Firstly, the results of state allocation down to the processing step S48 will be described. FIG. 16 is a schematic illustration of a model, showing as an example the results of state allocation in a model generation process of function Process 1 after an alteration in the first program to be verified. The model generating section 13 allocates pseudo-function A ( ) and function c ( ) as state A, pseudo-function B ( ) as state B, pseudo-function C ( ) as state C, pseudo-function D ( ) as state D, pseudo-function E ( ) as state E, "//1", "//2" and "//3" as state N123 and "//4", "//5" and "//6" as state N456 respectively. Now, the results of state optimization in the processing step S49 will be described below. FIG. 17 is a schematic illustration of a model, showing as an example the results of a model generation process of function Process 1 after an alteration in the first program to be verified. Here, state A, state B, state C and state D become a single basic block and, since there is not any marked part in it, they are integrated to state A'.

Figure 18:
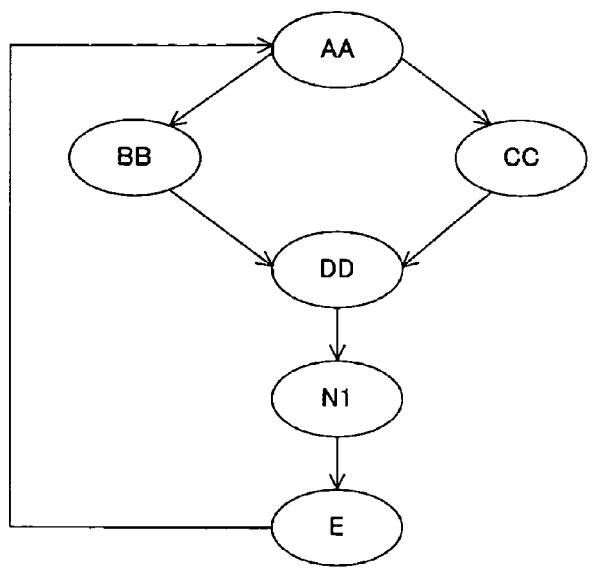
FIG. 18 is a schematic illustration of a model, showing as an example the results of state allocation in a model generation process of function Process 1 before an alteration in the first program to be verified.
Figure 19:
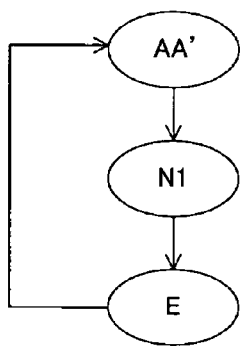
FIG. 19 is a schematic illustration of a model, showing as an example the results of a model generation process of function Process 1 before an alteration in the first program to be verified.

In a similar manner, the model generating section 13 executes a model generation process on function Process 1 and function Process 2 before an alteration. FIG. 18 is a schematic illustration of a model, showing as an example the results of state allocation in a model generation process of function Process 1 before an alteration in the first program to be verified. Pseudo-function AA ( ), pseudo-function BB ( ), pseudo-function CC ( ), pseudo-function DD ( ) and pseudo-function EE ( )are allocated respectively to state AA, state BB, state CC, state DD and state EE and the part that is marked with "//S" is allocated to state N1. FIG. 19 is a schematic illustration of a model, showing as an example the results of a model generation process of function Process 1 before an alteration in the first program to be verified. State AA, state BB, state CC and state DD become a single basic block and integrated to state AA' because there is not any marked part in it.

Figure 20:
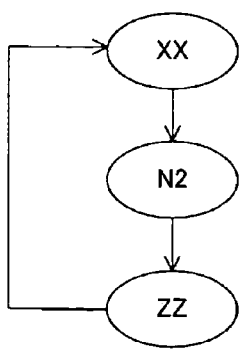
FIG. 20 is a schematic illustration of a model, showing as an example the results of a model generation process of function Process 2 in the first program to be verified.

FIG. 20 is a schematic illustration of a model, showing as an example the results of a model generation process of function Process 2 in the first program to be verified. Pseudo-function XX ( ) and pseudo-function ZZ ( ) are allocated respectively to state XX and state ZZ and the part that is marked with "//S" is allocated to state N2. No change takes place as a result of state optimization.

Then, the verifying section 14 executes a verification process, using the results of the model generation process (S14). While techniques that can be used for a verification process include model check and rule base check, the model check technique is used for the verification process in this embodiment.

Figure 21:
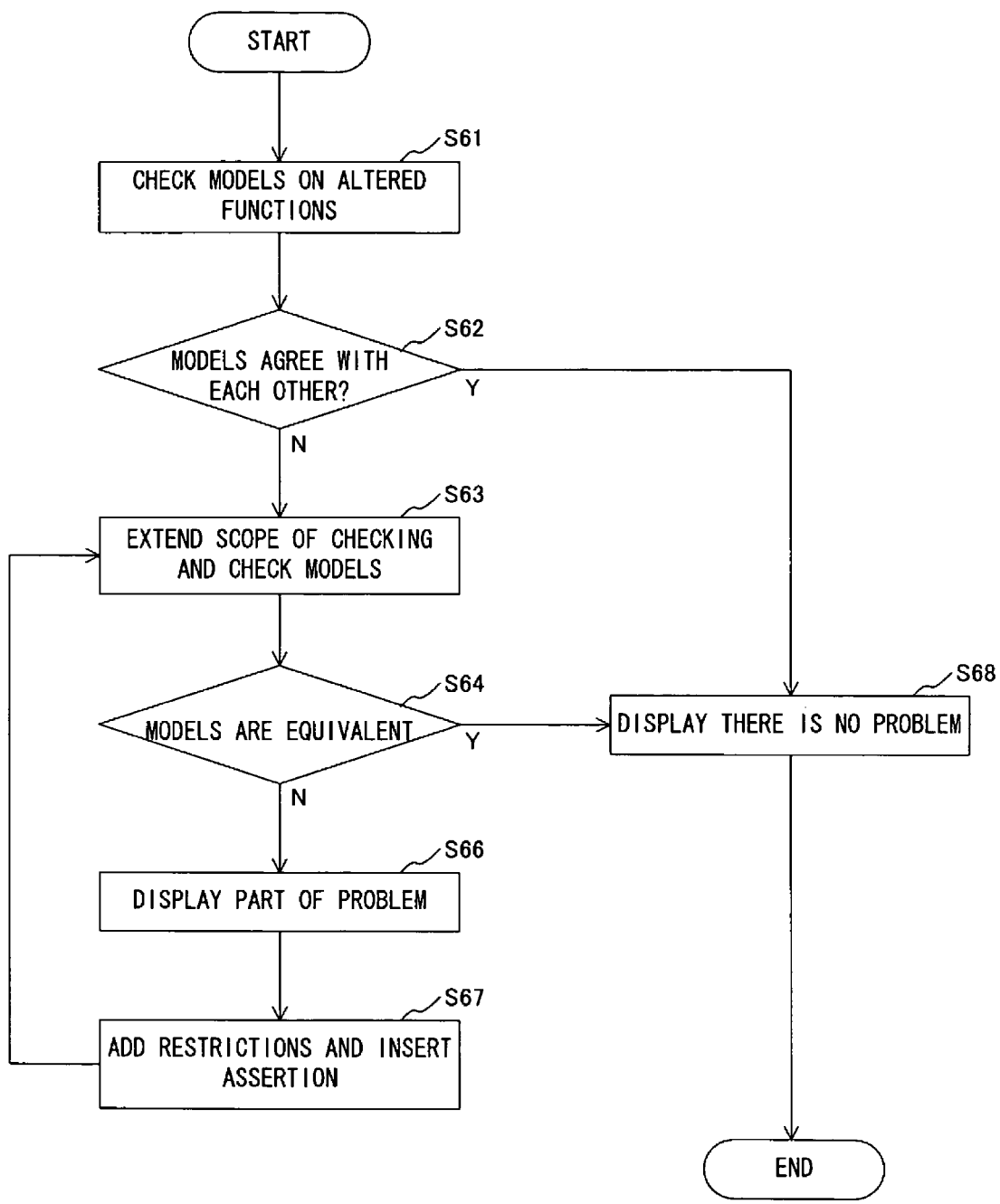
FIG. 21 is a flow chart of an example of operation of a verification process according to the invention.

FIG. 21 is a flow chart of an example of operation of a verification process according to the invention. Referring to FIG. 21, firstly the verifying section 14 performs a model check operation on the altered functions in the set of FSM models output from the model generating section 13 (S61) and determines if the models are equivalent or not (S62). If the models are equivalent (S62, Y), the verifying section 14 proceeds to processing step S68. If, on the other hand, the models are not equivalent (S62, N), the verifying section 14 extends the range of functions to be verified and performs a model check operation (S63) so as to determine if the models are equivalent or not (S64). If the models are equivalent (S64, Y), the verifying section 14 proceeds to processing step S68. If, on the other hand, the models are not equivalent (S64, N), the verifying section 14 displays the part that is a problem (S66). Then, if possible, it adds a restriction to the operation of the program and, if necessary, inserts assertion according to the direction of the designer (S67). Then, it returns to processing step S63. In processing step S68, the verifying section 14 displays that there is not any problem due to the alteration (S68) and ends the flow.

In the verification process, the model before an alteration and the model after the alteration are compared for a function that is altered and a model check operation is conducted. If the models are found to be equivalent as a result of the verification process, the altered part is guaranteed to behave just like before the alteration and hence it is possible to guarantee that the program does not have an error as a whole. If, on the other hand, the models are not equivalent, the program can have an erroneous behavior and hence the range of functions to be verified is extended and the functions that are detected in the alteration detection process are verified in addition to the altered functions. If no error is found as a result, it is possible to guarantee that the program does not have an error as a whole.

A product of states is prepared by taking the partial order relation of the models of the functions in order to extend the scope of verification and express the mutual influence of a plurality of functions that operate concurrently and in parallel. Then, the product of states is subjected to verification with an extended scope. A known algorithm is used to obtain the product of states. Such algorithms are described in detail in Berard, B., Bidoit, M., Finkel, A., Laroussinie, F., Petit, A., Petrucci, L., Schnoebelen, P. "Systems and Software Verification Model—Checking Techniques and Tools", Springer-Verlag, 2001.

Figure 22:
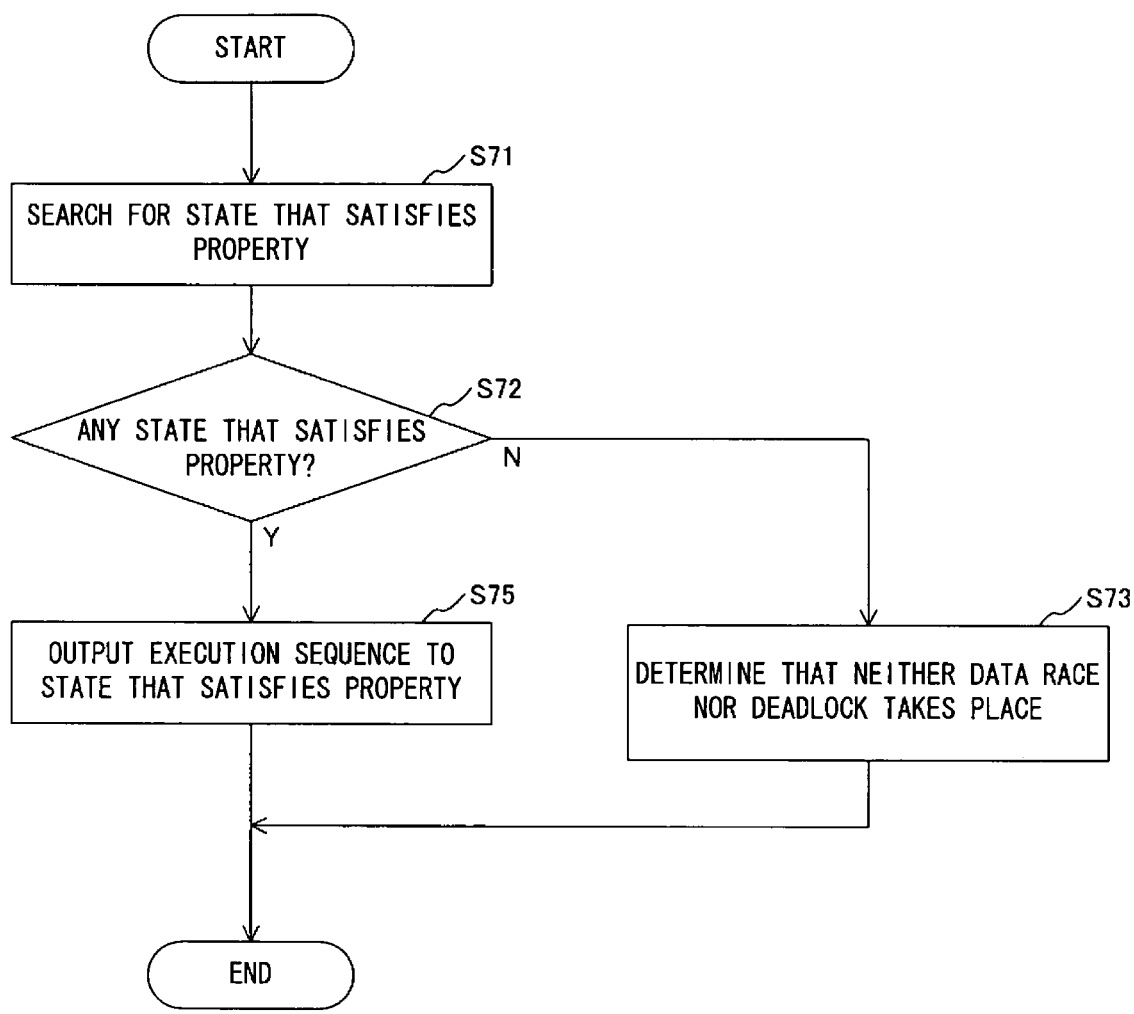
FIG. 22 is a flow chart of an example of operation of a trace generation process according to the invention.

If a problem is found as a result of the verification process, a trace generation process of outputting the sequence of execution, for example, will be an effective means for showing the cause of the error in the processing step S66. FIG. 22 is a flow chart of an example of operation of a trace generation process according to the invention. An FSM and the property to be verified are input to the trace generation process. In this embodiment, the property to be verified is checking if a deadlock or a data race exists or not. Firstly, the verifying section 14 searches for a state that satisfies the property to be verified in the FSM sequentially from the initial state (S71) and determines if there is a state that satisfies the property to be verified (S72). If there is not any state that satisfies the property to be verified (S72, N), the verifying section 14 determines that neither a deadlock nor a data race takes place (S73) and ends the flow. If, on the other hand, there is a state that satisfies the property to be verified (S72, Y), the verifying section 14 outputs the sequence of execution from the initial state to the state that satisfies the property as trace (S75) and ends the flow.

If the scope of verification is extended again, it is possible for the designer to execute the verification process after defining restrictions on the operation of the program in the processing step S63. When the designer inputs them to the source code as assertion, it is easy to detect the part, if any, that does not observe the restrictions when conducting a test after the end of the debugging operation.

Now, a specific example of verification process will be described below. In this example, firstly, the model of function Process 1 before an alteration and the model of function Process 1 after the alteration are compared. Since the models are not equivalent as a result, an error can occur. Therefore, the verification process is conducted once again. This time, function Process 2 that can be influenced by the alteration of function Process 1 is included. Then, as a result, it is detected that an error will occur and that an error will occur in the next step of execution. The verifying section 14 displays the outcome of detection.

XX→A'→N123→E→N2→N456→ZZ

Reading variable shared 1 (invoking function g) from and writing it to function Process 1 before an alteration is protected by a lock so that it is not interrupted (preempted) by function Process 2. Additionally, when function Process 2 is protected by a lock, the value of shared variable shared 1 is incremented without fail after the function g of the function Process 1 is invoked.

On the other hand, when the sequence of execution using function Process 1 after an alteration does not meet the specified requirements, both state N123 (invocation of function g) and state N456 (writing variable shared 1) are protected by a lock. State N2 (region protected by the lock) of function Process 2 is executed in between state N123 and state N456.

Because lock l is released after the read of variable shared 1 in state N123, there is no guarantee that the value of variable shared 1 will not be modified before lock l is acquired again in state N456. The value of variable shared 1 is not incremented when state N2 is executed. Therefore, the behavior is different from the behavior before the alteration.

Such a behavior can be corrected when the designer defines restrictions. In the case of this program, no error occurs when an interruption (preemption) to state N2 of function Process 2 is prohibited while function Process 1 is in state N123, state E or state N456.

Second Embodiment

This embodiment will be described below in terms of a deadlock that takes place when the sequence of synchronizing mechanism for arbitration of accesses to a shared variable is changed.

The verification apparatus of this embodiment has a configuration similar to that of the first embodiment. The operation of the verification apparatus will be described in the case of using the second program to be verified, which is a specific example of parallel program. The source code of the second program to be verified comprises a definition of a shared variable, a function Process 3 and another function Process 4. FIG. 23 is a schematic illustration of the source code showing the definition of the shared variable in the second program to be verified. FIG. 24 is a schematic illustration of the source code showing the function Process 3 in the second program to be verified. FIG. 25 is a schematic illustration of the source code showing the function Process 4 before an alteration in the second program to be verified.

FIG. 26 is a schematic illustration of the source code showing function Process 4 after an alteration in the second program to be verified. As shown in FIG. 26, the function Process 4 is altered for the locking sequence. As a result of this alteration, the locking sequence of the function Process 3 and that of the function Process 4 differs from each other when accessing the shared variable.

FIG. 27 is a schematic illustration of the source code showing as an example the results of a source code sorting process of function Process 4 after an alteration in the second program to be verified. Then, pseudo-function D ( ) and pseudo-function F ( ) are allocated respectively to state D and state F by means of a model generation process. The region (marked by "//E") that is protected by a lock is regarded as basic block and a state unfolding process is executed. In other words, in this embodiment, the following state unfolding process is executed in place of the above described processing step S45 in a model generation process.

Figure 28:
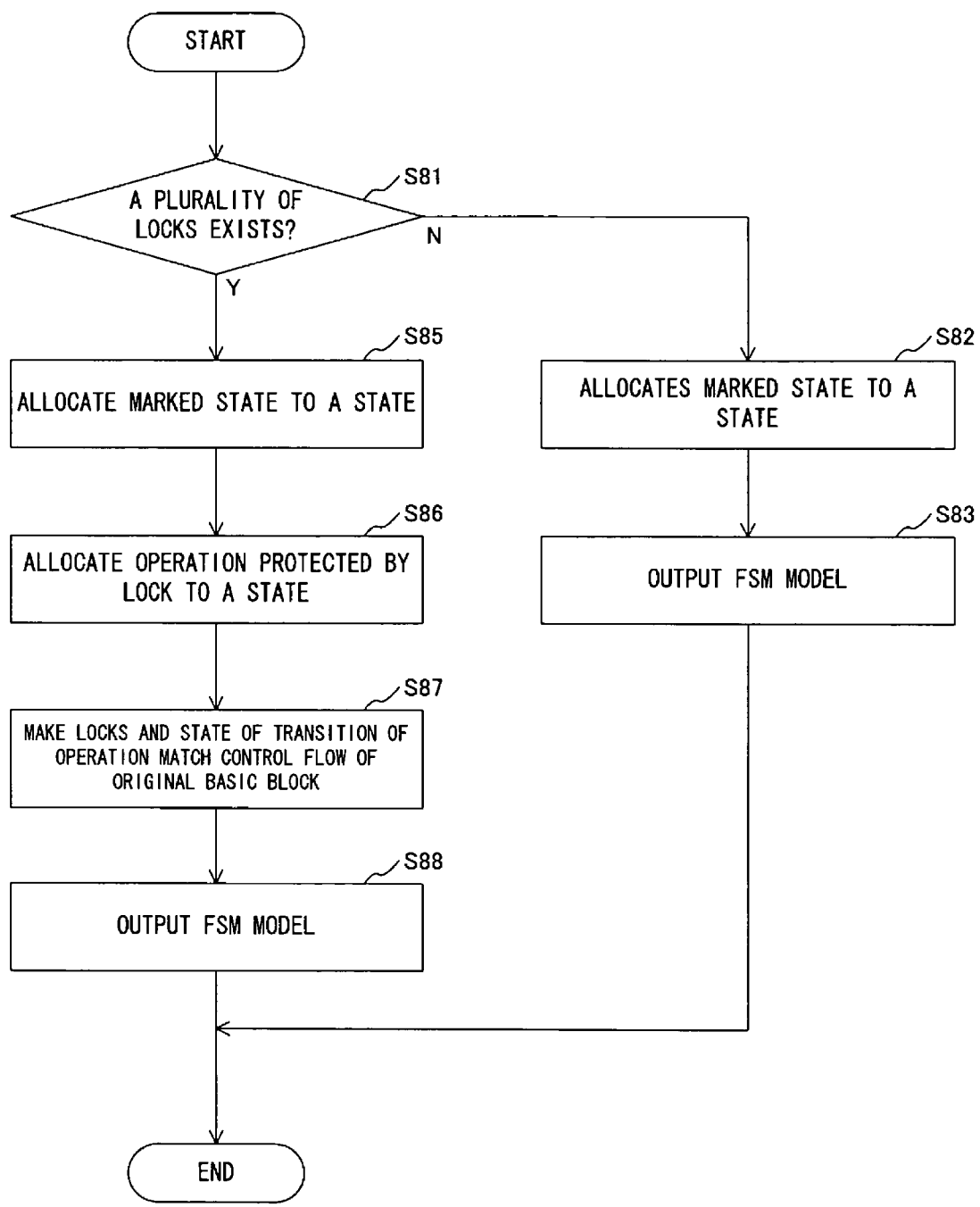
FIG. 28 is a flow chart of an example of operation of a state unfolding process according to the invention.

FIG. 28 is a flow chart of an example of operation of a state unfolding process according to the invention. Referring to FIG. 28, firstly the model generating section 13 determines if there is a plurality of locks in a part of the basic block that is marked and separated in the processing step S45 or not (S81). If there is not a plurality of locks (S81, N), the model generating section 13 allocates a marked state to a state (S82) as in the processing step S45 and output an altered FSM model (S83) before it ends the flow. If, on the other hand, there is a plurality of locks (S81, Y), the model generating section 13 allocates the states that the locks can take to the FSM (S85) and also the operation protected by the locks to a state (S86), makes the locks and the state of transition of the operation matches the control flow of the original basic block (S87) and then outputs the altered FSM model (S88) before it ends the flow.

Figure 29:
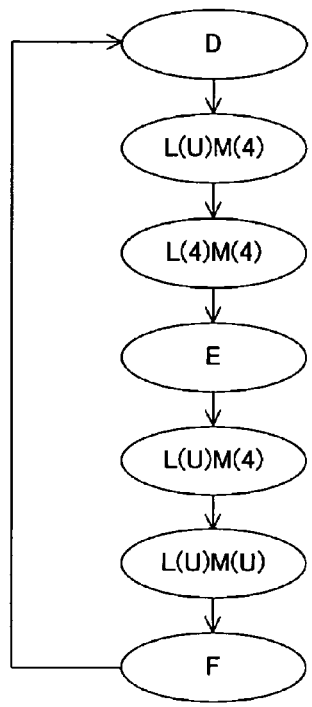
FIG. 29 is a state transition diagram showing as an example the results of a model generation process of function Process 4 after an alteration in the second program to be verified.
Figure 30:
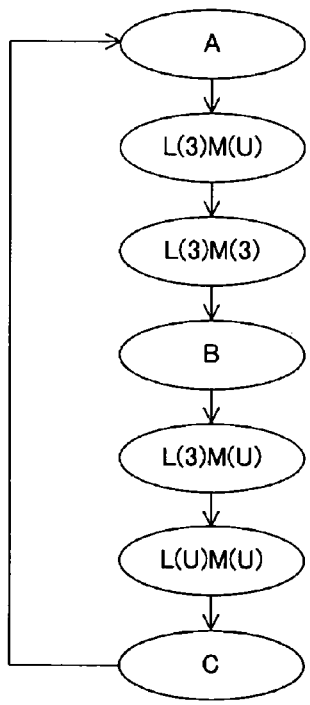
FIG. 30 is a state transition diagram showing as an example the results of a model generation process of function Process 3 in the second program to be verified.
Figure 31:
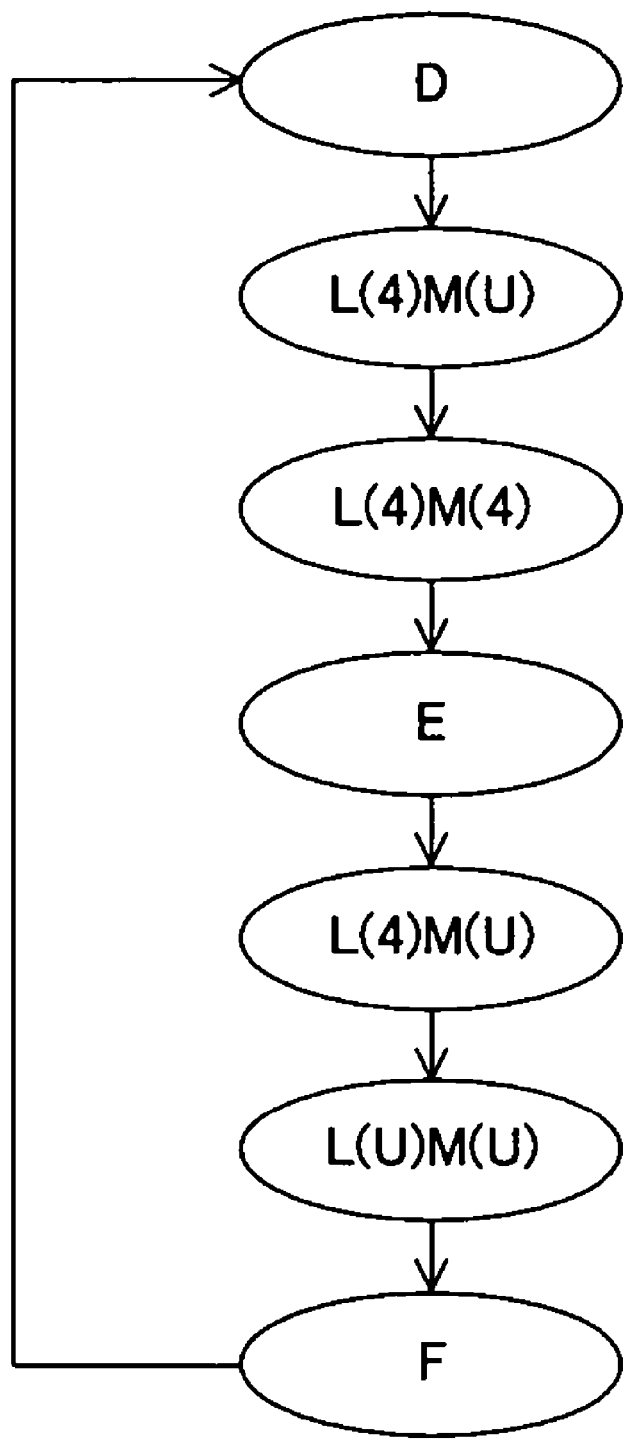
FIG. 31 is a state transition diagram showing as an example the results of a model generation process of function Process 4 before an alteration in the second program to be verified.

In processing step S83, the model generating section 13 allocates the states of the FSM to the states that the locks can take. As a result, the four states as listed below are allocated in function Process 4.

state N10. acquisition of lock m before operation
state N20. acquisition of lock l before operation and after acquisition of lock m
state N30. release of lock l immediately after operation
state N40. release of lock m after operation and the release of lock l The operation is allocated to a state in processing step S84. In this case, a state is allocated between the state N20 and the state N30 listed above to produce the following five states.

state N10. acquisition of lock m before operation
state N20. acquisition of lock l before operation and after acquisition of lock m
state N25. operation
state N30. release of lock l immediately after operation
state N40. release of lock m after operation and the release of lock l FIG. 29 is a state transition diagram showing as an example the results of a model generation process of function Process 4 after an alteration in the second program to be verified. Referring to FIG. 29, state L (U) refers to a state where the lock l is unlocked, state L (3) refers to a state where function Process 3 acquires the lock l and state L (4) refers to a state where function Process 4 acquires the lock l, whereas state M (U) refers to a state where the lock m is unlocked, state M (3) refers to a state where function Process 3 acquires the lock m and state M (4) refers to a state where function Process 4 acquires the lock m. Additionally, when a plurality of function is verified as objects of verification, it is expressed by the product of states. The state L (U) M (4) through the state L (U) M (U) in FIG. 29 correspond to the state N10 through the state N40. The FSM of function Process 3 and that of function Process 4 before an alteration can be obtained by following a similar sequence. FIG. 30 is a state transition diagram showing as an example the results of a model generation process of function Process 3 in the second program to be verified. FIG. 31 is a state transition diagram showing as an example the results of a model generation process of function Process 4 before an alteration in the second program to be verified.

Then, the function Process 4 after an alteration is not equivalent with the function Process 4 before the alteration in processing step S61 of the verification process. Therefore, the range of functions to be verified is extended to include function Process 3 for verification. To verify the influence of function Process 3 and function Process 4 that operate concurrently, the product of states of the two functions is prepared by taking the partial order relation and the product is verified. As a result of this model checking operation, it is found that the sequence of execution as shown below leads to a deadlock.

$$A \rightarrow D \rightarrow L\ (3)\ M\ (U) \rightarrow L\ (3)\ M\ (4) \rightarrow deadlock$$

The cause of the deadlock is that function Process 4 acquires lock m (state L (3) M (4)) after function Process 3 acquires lock l (state L (3) M (U)). Thus, the lock l and the lock m are acquired respectively by the function Process 3 and the function Process 4. If the function Process 3 tries to acquire the lock m, the process comes to a standstill because the function Process 4 has already acquired it. Similarly, if the function Process 4 tries to acquire the lock l, the process comes to a standstill because the function Process 3 has already acquired it. In this case, the alteration has to be undone in order to correct the error.

As described above in detail, according to the invention, it is possible to remarkably reduce the time required for verification by preparing models, paying attention to the shared resources and the locks that are influenced by an alteration to a concurrent/parallel program.

Furthermore, according to the invention, there is provided a program for verifying a program that causes a computer that operates as a program verification apparatus to execute the above described processing steps. More specifically, it is possible to cause a computer that operates as a program verification apparatus to execute such a program when the program is stored in a computer-readable recording medium. Computer-readable recording media that can be used for the purpose of the present invention include internal storage devices such as ROMs and RAMs that are installed in computers, portable type storage media such as CD-ROMs, flexible disks, DVD disks, magneto-optical disks and IC cards, and databases for holding computer programs as well as other computers, their databases.

For the purpose of the present invention, a detection step corresponds to the alteration detection process and the source code sorting process of the above-described embodiments. A model generation step corresponds to the model generation process of the above-described embodiments. Additionally, a verification step corresponds to the verification process of the above-described embodiments and a verifying section corresponds to the alteration detecting section and the source code sorting section of the above-described embodiments.

What is claimed is:

1. A computer-readable storage medium storing a verification program that causes a computer to execute a process comprising:

reading from a memory a first program and a second program to which the first program is altered by an alteration, the first program and the second program being a concurrent program or a parallel program;

detecting a first function altered by the alteration, a second function using a shared variable influenced by the alteration, a first part having an altered part in the first function and an influenced part using the influenced shared variable in the second function, a control structure part relating to the control of processing by the first program and the second program, and a second part other than the first part and the control structure part in the first program and the second program, from the first program and the second program, according to a difference between the first program and the second program;

generating a first model which is a finite state machine that represents the first program and a second model which is a finite state machine that represents the second program, the generating allocating each of basic blocks in the first part and the second part to a state in the first model and the second model and determining transitions in the first model and the second model according to the control structure part, each of the basic blocks having only one entrance and only one exit for a control flow;

comparing the first model to the second model;

verifying the second program by a trace process which searches whether a deadlock or a data race exists or not sequentially according to the state of determined transitions in the first model and the second model from an initial state ("determined transitions" is cited from generating step in previous paragraph as in bold); and displaying a result of the verifying on a display device.

2. The computer-readable storage medium according to claim 1, wherein the first part has a part in which the influenced shared variable appears or a part which locks the influenced shared variable.

3. The computer-readable storage medium according to claim 1, wherein the detecting adds a mark to the first part in the first program so as to detect the second part.

4. The computer-readable storage medium according to claim 1, wherein when the first model or the second model has a plurality of the states except the first part, the generating puts the plurality of the states into a single state.

5. The computer-readable storage medium according to claim 1, wherein when it is determined that the first model and the second model are not equivalent by the comparing, the comparing determines a first product of a model of the first function and a model of the second function in the first model, and a second product of a model of the first function and a model of the second function in the second model, and compares the first product and the second product, and the verifying verifies the second program according to result of the comparing of the first product and the second product.

6. The computer-readable storage medium according to claim 1, wherein when it is determined that the first model and the second model are not equivalent by the comparing, the comparing detects a state that causes a predetermined error and the displaying displays the detected state on the display device.

7. The computer-readable storage medium according to claim 1, wherein when it is determined that the first model and the second model are not equivalent by the comparing, the comparing detects a state and a sequence of execution and the displaying displays the detected sequence on the display device, the detected state causing a predetermined error, the detected sequence causing the detected state.

8. The computer-readable storage medium according to claim 1, wherein the verifying verifies the second program using a rule base check or a model check.

9. A verification apparatus for verifying a program that verifies a concurrent program or a parallel program composed so as to include a plurality of functions after an alteration made to the program to be verified, the verification apparatus comprising:
a detecting section reading from a memory a first program and a second program to which the first program is altered by an alteration, the first program and the second program being a concurrent program or a parallel program;
the detecting section detecting a first function altered by the alteration, a second function using a shared variable influenced by the alteration, a first part having an altered part in the first function and an influenced part using the influenced shared variable in the second function, a control structure part relating to the control of processing by the first program and the second program, and a second part other than the first part and the control structure part in the first program and the second program, from the first program and the second program, according to a difference between the first program and the second program;
a model generating section generating a first model which is a finite state machine that represents the first program and a second model which is a finite state machine that represents the second program, the generating allocating each of basic blocks in the first part and the second part to a state in the first model and the second model and determining transitions in the first model and the second model according to the control structure part, each of the basic blocks having only one entrance and only one exit for a control flow;
a verifying section comparing the first model to the second model;
the verifying section verifying the second program by a trace process which searches whether a deadlock or a data race exists or not sequentially according to the state of determined transitions in the first model and the second model from an initial state; and
the verifying section displaying a result of the verifying on a display device.

10. The apparatus according to claim 9, wherein the first part has a part in which the influenced shared variable appears or a part which locks the influenced shared variable.

11. The apparatus according to claim 9, wherein the detecting section adds a mark to the first part in the first program so as to detect the second part.

12. The apparatus according to claim 9, wherein when the first model or the second model has a plurality of the states except the first part, the model generating section puts the plurality of the states into a single state.

13. The apparatus according to claim 9, wherein when it is determined that the first model and the second model are not equivalent by the verifying section, the verifying section determines a first product of a model of the first function and a model of the second function in the first model, and a second product of a model of the first function and a model of the second function in the second model, and compares the first product and the second product, and the verifying section verifies the second program according to result of the comparing of the first product and the second product.

14. The apparatus according to any of claim 9, wherein when it is determined that the first model and the second model are not equivalent by the verifying section, the verifying section detects a state that causes a predetermined error and the displaying displays the detected state on the display device.

15. The apparatus according to any of claim 9, wherein when it is determined that the first model and the second model are not equivalent by the verifying section, the verifying section detects a state and a sequence of execution and the displaying displays the detected sequence on the display device, the detected state causing a predetermined error, the detected sequence causing the detected state.

16. The apparatus according to any of claim 9, wherein the verifying section verifies the second program using a rule base check or a model check.

17. A computer-readable storage medium storing a verification method for verifying a program that verifies a concurrent program or a parallel program composed so as to include a plurality of functions after an alteration made to the program to be verified, the verification method comprising:
reading from a memory a first program and a second program to which the first program is altered by an alteration, the first program and the second program being a concurrent program or a parallel program;
detecting a first function altered by the alteration, a second function using a shared variable influenced by the alteration, a first part having an altered part in the first function and an influenced part using the influenced shared variable in the second function, a control structure part relating to the control of processing by the first program and the second program, and a second part other than the first part and the control structure part in the first program and the second program, from the first program and the second program, according to a difference between the first program and the second program;

generating a first model which is a finite state machine that represents the first program and a second model which is a finite state machine that represents the second program, the generating allocating each of basic blocks in the first part and the second part to a state in the first model and the second model and determining transitions in the first model and the second model according to the control structure part, each of the basic blocks having only one entrance and only one exit for a control flow;

comparing the first model to the second model;

verifying the second program by a trace process which searches whether a deadlock or a data race exists or not sequentially according to state of the determined transitions in the first model and the second model from an initial state; and displaying a result of the verifying on a display device.

18. The computer-readable storage medium according to claim 17, wherein the first part has a part in which the influenced shared variable appears or a part which locks the influenced shared variable.

* * * * *

UNITED STATES PATENT AND TRADEMARK OFFICE
CERTIFICATE OF CORRECTION

| | | |
|---|---|---|
| PATENT NO. | : 7,844,953 B2 | Page 1 of 1 |
| APPLICATION NO. | : 11/237663 | |
| DATED | : November 30, 2010 | |
| INVENTOR(S) | : Rafael Kazumiti Morizawa et al. | |

It is certified that error appears in the above-identified patent and that said Letters Patent is hereby corrected as shown below:

Column 14, Line 63, in Claim 1, delete "of determined" and insert --of the determined--, therefor.

Column 14, Lines 65-66, in Claim 1, after "initial state" delete "("determined transitions" is cited from generating step in previous paragraph as in bold)".

Column 18, Line 3, in Claim 17, delete "to state" and insert --to the state--, therefor.

Signed and Sealed this
Twenty-second Day of March, 2011

David J. Kappos
*Director of the United States Patent and Trademark Office*